July 7, 1925.
J. J. MARTIN
1,545,002
DRILL HOLDING INSERT FOR DRILL CHUCKS
Filed Oct. 19, 1921
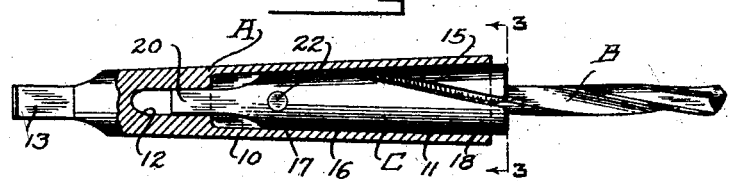
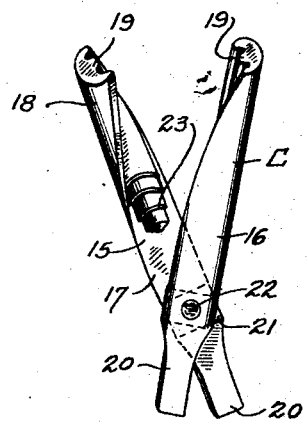
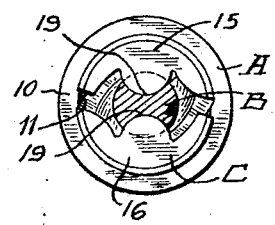
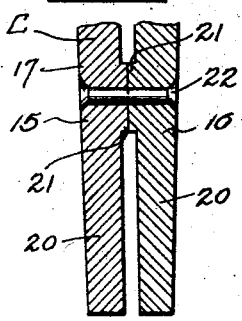
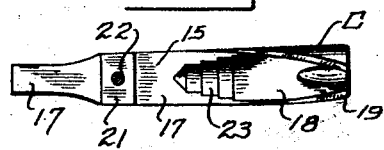
Inventor
John J. Martin
By Lancaster and Allwine
Attorneys Patented July 7, 1925.

UNITED STATES PATENT OFFICE.

JOHN J. MARTIN, OF BERWICK, PENNSYLVANIA.

DRILL-HOLDING INSERT FOR DRILL CHUCKS.

Application filed October 19, 1921. Serial No. 508,725.

*To all whom it may concern:*

Be it known that I, JOHN J. MARTIN, a citizen of the United States, residing at Berwick, in the county of Columbia and State of Pennsylvania, have invented certain new and useful Improvements in Drill-Holding Inserts for Drill Chucks, of which the following is a specification.

This invention relates to attachments for drills and drill chucks and the primary object of the present invention is to provide a novel device for holding broken drills in their chucks, thereby eliminating the necessity of discarding broken drills as now practised.

In large machine shops, the loss annually from broken drills amounts to quite a large sum, not counting the time of the mechanics consumed in getting a new drill of the same size. This invention permits the pointed end of the same drill to be used after the drill breaks, thereby eliminating the loss of time consumed in obtaining a new drill and permitting the other portion of the drill to be ground and sharpened for use with the attachment at a later time.

Another object of the invention is the provision of an insert for ordinary drill chucks for holding broken drills, which is so constructed as to form a brace for the drill at the point where the greatest strain occurs thereon, thereby preventing the rebreaking of the drill and insuring longevity thereto, the insert also eliminating the necessity of providing shanks on new drills for engaging in the sockets of the chucks, thereby resulting in the saving of metal on new drills, the said new drills being made double pointed if so desired.

A further object of the invention is the provision of a novel insert for ordinary drill chucks for holding broken or double pointed drills embodying a two part body, the parts being so disposed and associated together in such a manner as to permit drills of various sizes to be accommodated without wabbling or chattering and to allow the ready removing of a drill after the insert has been removed from the chuck.

A still further object of the invention is to provide a novel insert for holding broken or double pointed drills of the above character, which will be durable and efficient in use, one that will be simple and easy to manufacture, and one which can be placed upon the market at a minimum cost.

With these and other objects in view, the invention consists in the novel construction, arrangement and formation of parts, as will be hereinafter more specifically described, claimed and illustrated in the accompanying drawings, forming a part of this specification, in which drawings:

Fig. 1 is an elevation of the novel insert showing the same in operative position in a drill chuck and holding a drill, the drill chuck being shown in longitudinal section.

Figure 2 is a detail perspective view of the novel insert, showing the parts of the body in their spread position for permitting a drill to be readily removed therefrom.

Figure 3 is a detail sectional elevation taken on the line 3—3 of Figure 1.

Figure 4 is a fragmentary longitudinal section through the inner end of the insert, illustrating the means for associating the parts of the body thereof together.

Figure 5 is an elevation of one part of the drill chuck insert showing the inner face thereof, the pivot for said part being shown in section.

Referring to the drawings in detail, wherein similar reference characters designate corresponding parts throughout the several views, the letter A indicates a drill chuck; B, a drill; and C, the improved drill chuck insert for holding the drill in said chuck.

The drill chuck A and the drill B has been merely shown for the purpose of illustrating the use of the improved drill chuck insert C, and it is to be understood that the ordinary or any preferred type of drill chuck A and drill B can be used.

The drill chuck A, as shown, is of the round type and includes the tapered body 10 having the inwardly extending tapered bore 11 for the reception of the drill B. The inner end of the tapered bore 11 terminates in a square or polygonal shaped socket 12 for the reception of the ordinary shank portion of the drill. The inner end of the chuck A is provided with the ordinary shank 13 for engaging in the chuck holder of the lathe or other machine with which the device is to be used.

The drill B is of the ordinary twist type and the novel insert C is adapted to be used in connection therewith when the same has been broken or the shank portion so scarred as not to fit within the socket portion 12 of the chuck or when the same becomes too short for use with certain types of drill chucks.

The improved drill chuck insert C consists of companion sections 15 and 16, which are constructed identically the same. Each of the sections 15 and 16 includes a body portion 17 which has a leg 18 twisted to conform to the configuration of the drill with which it is to be associated. The inner surface of the leg 18 of each section of the drill chuck insert C is provided with a centrally disposed spirally arranged rib 19 for fitting in the grooves or channels formed in the drill. The inner end of each one of the sections 15 and 16 terminate in a shank portion 20 and when the shank portions 20, are brought into alignment, the same are adapted to fit within the socket portion 12 of the drill chuck A. The inner faces of the sections 15 and 16 intermediate the legs 18 and shank portions 20 are provided with inwardly extending bearing faces or lugs 21, which hold the sections in spaced relation so as to permit the ready insertion of a drill therein and to permit the ready swinging of the sections on the pivot pin 22, which passes diametrically through the sections and the bearing lugs 21 formed thereon. The inner end of the legs 18 of the sections 15 and 16 may terminate in semi-cylindrical socket portions 23. As shown, the semi-cylindrical socket portions 23 are formed stepped, that is the radius thereof decreased in stepped relation toward the inner ends of the sections, so that various sizes of the drills can be accommodated, and so that the drills will be automatically centered in the insert.

The fact that the outer ends of the sections 15 and 16 are twisted, at substantially right angles to the body portions thereof, permits the pivot pin 22 to extend substantially in parallel relation to the inner working faces of the twisted ends of the sections and thereby allows these inner working faces to lie in substantially parallel relation to one another as the drill chuck insert is spread. This allows drills of various sizes to be accommodated and in actual practice, one size of insert can readily accommodate drills from seven thirty-seconds of an inch to nine thirty-seconds of an inch and beyond. It also can be seen that the pivot pin 22 is disposed at right angles to strain coming on the sections 15 and 16. This will prevent any tendency of the sections 15 and 16 to spread, when the insert is in use.

In use of the improved insert, when a drill breaks, the broken end thereof is inserted between the sections 15 and 16 of the insert, and the sections are moved into intimate contact with the drill. The insert, with the drill therein, is then placed in the drill chuck A with the shank portion 20 thereof disposed in the socket portion 12 of the chuck. The drill is then again ready for use.

When it is desired to remove the drill, it is merely necessary to remove the insert from the chuck and spread the sections 15 and 16 and the drill can then be readily and easily taken from out of the insert, without the use of any tools.

It can be seen from the foregoing, that the insert C will firmly grasp a drill and form a reinforcement thereof at the point where the greatest strain occurs thereon, thus preventing any tendency of the drill to break or bend.

From the preceding description, it can be seen that a novel and simple device has been provided for effectively permitting the use of a drill when the same becomes broken, thereby eliminating the waste and expense incident to the discarding of broken drills.

Changes in details may be made without departing from the spirit or scope of this invention; but,

I claim:

1. An insert for holding broken and shankless drills in a standard drill chuck comprising a pair of companion sections, means pivotally connecting the sections together intermediate their ends, twisted legs formed on the inner ends of the sections for engaging a twisted portion of the drill, and shank portions formed on the opposite ends of the sections for engaging the socket portion of a drill chuck.

2. An insert for holding broken and shankless drills in standard drill chucks comprising a pair of twisted members for engaging the twisted portion of a drill, means for adjusting the members in relation to one another for engaging different sizes of drills, and means carried by said members for engaging in a socket of a drill chuck.

3. An insert for holding broken and shankless drills in standard drill chucks comprising a pair of companion sections, each of the sections including a body and a forwardly extending twisted portion, the twisted portion being substantially semi-cylindrical in cross section, a spirally disposed lug carried by each twisted portion intermediate the side edges thereof, and a shank portion formed on the inner end of each one of said bodies.

4. An insert for holding different sizes of broken and shank drills shaped to provide a pair of twisted members for engaging the opposite sides of a twisted portion of a drill, and stepped sockets of different sizes at the inner end of the twisted portions of said insert to facilitate the centering of drills of various sizes, and a shank formed on said insert.

5. An insert for holding different sizes of broken and shankless drills in standard drill chucks comprising a pair of sections, each one of said sections including a body, and a forwardly extending semi-cylindrical twisted leg, an inwardly extending shank formed on the other end of said body, inwardly extending bosses formed on each one of the bodies, a pivot pin extending through the bodies and bosses for pivotally connecting the sections together, the inner ends of the twisted legs having semi-cylindrical stepped sockets of different sizes formed therein, and diagonally extending lugs formed on the twisted legs adjacent to the forward ends thereof and disposed intermediate the longitudinal edges of the legs.

JOHN J. MARTIN.